Dec. 9, 1969  P. HEDGEWICK  3,482,814
MOLD APPARATUS FOR MAKING SAFETY CAPS
Original Filed April 5, 1966
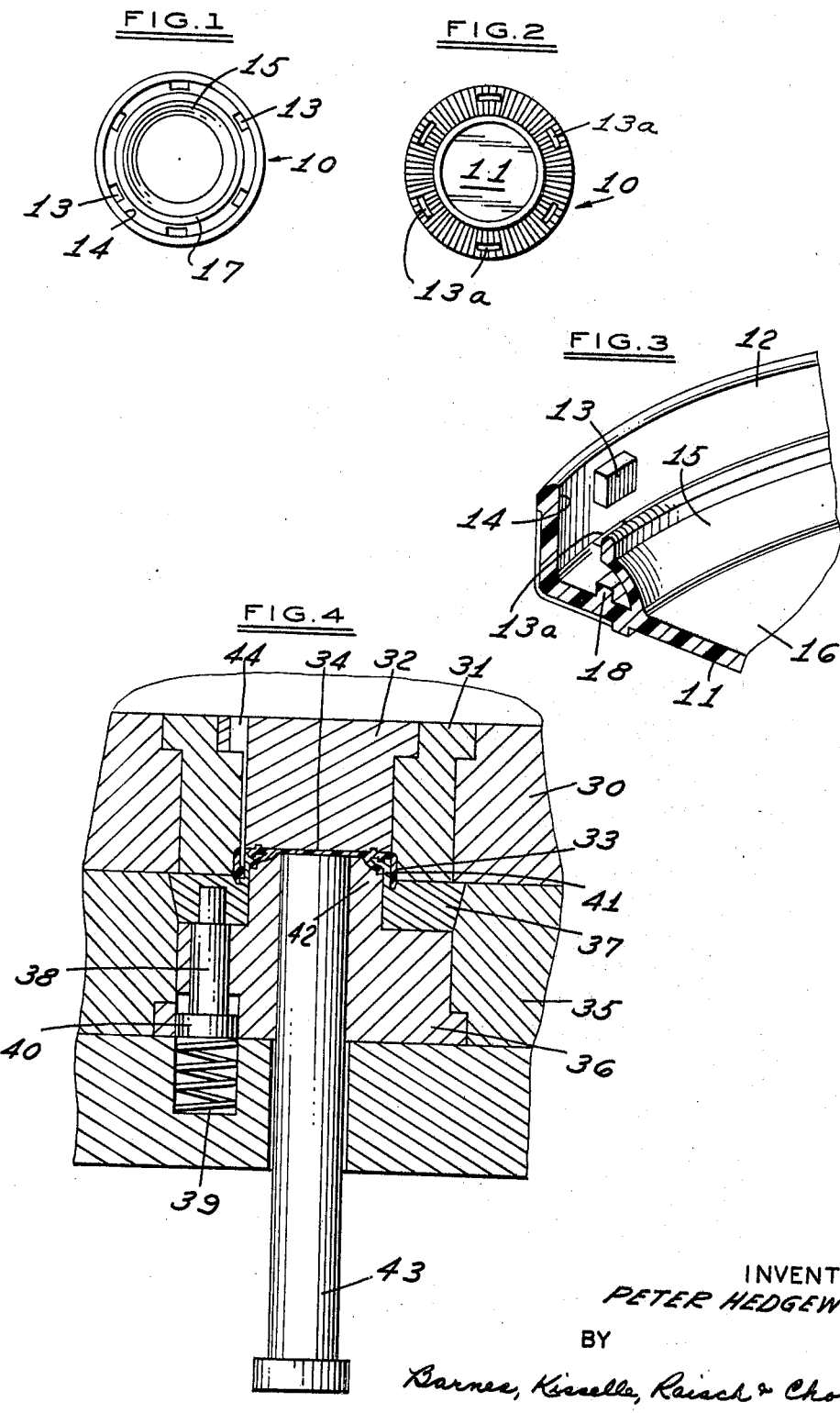
INVENTOR
PETER HEDGEWICK
BY
Barnes, Kisselle, Raisch & Choate
ATTORNEYS United States Patent Office 3,482,814
Patented Dec. 9, 1969

3,482,814
MOLD APPARATUS FOR MAKING SAFETY CAPS
Peter Hedgewick, Windsor, Ontario, Canada, assignor to Reflex Corporation of Canada Limited, Windsor, Ontario, Canada, a corporation of Canada
Continuation of application Ser. No. 664,099, Aug. 29, 1967, which is a division of application Ser. No. 540,338, Apr. 5, 1966. This application July 17, 1968, Ser. No. 749,248
Int. Cl. B28b 7/10; B29c 7/00
U.S. Cl. 249—67                            17 Claims

ABSTRACT OF THE DISCLOSURE

The apparatus disclosed herein is utilized for making a cap having a base, a peripheral flange, a plurality of radially inwardly extending lugs on the inner surface of the peripheral flange adapted to engage notches on projections of a container and a flexible web on the inner surface of the base extending generally axially and radially for engaging the upper end of a container. The apparatus comprises a cavity body having a cavity therein for defining the outer surface of the base and the outer surface of the peripheral flange. A core body having a core member is mounted for axial movement and spring means yieldingly urge the core member toward the cavity body. The core member has a surface defining the inner surface of the flange of the cap and a portion of the inner surface of the base of the flange and the outer surface of the cap. The core body has another portion defining the remaining surface of the cap and the remaining portion of the inner surface of the base. A plurality of pin members extend axially from the cavity body into the space defined by the cavity body and the core member for forming the flange to cause the ends of the pin members to define portions of the lugs on the inner surface of the cap.

---

This invention relates to apparatus for making safety caps. This application is a continuation of application Ser. No. 664,099, filed Aug. 29, 1967, now abandoned, which is in turn a division of application Ser. No. 540,338, filed Apr. 5, 1966, now Patent No. 3,344,942.

Background of the invention

Among the objects of the invention are to provide a relatively simple and inexpensive apparatus for forming a safety cap in one piece.

Summary

The apparatus disclosed herein is utilized for making a cap having a base, a peripheral flange, a plurality of radially inwardly extending lugs on the inner surface of the peripheral flange adapted to engage notches on projections of a container and a flexible web on the inner surface of the base extending generally axially and radially for engaging the upper end of a container. The apparatus comprises a cavity body having a cavity therein for defining the outer surface of the base and the outer surface of the peripheral flange. A core body having a core member is mounted for axial movement and spring means yieldingly urge the core member toward the cavity body. The core member has a surface defining the inner surface of the flange of the cap and a portion of the inner surface of the base of the flange and the outer surface of the cap. The core body has another portion defining the remaining surface of the cap and the remaining portion of the inner surface of the base. A plurality of pin members extend axially from the cavity body into the space defined by the cavity body and the core member for forming the flange to cause the ends of the pin members to define portions of the lugs on the inner surface of the cap.

Description of the drawings

FIG. 1 is a bottom plan view of the cap which is to be made by the apparatus embodying the invention.
FIG. 2 is a top plan view of the cap.
FIG. 3 is a fragmentary sectional perspective view of the cap.
FIG. 4 is a fragmentary sectional view through the apparatus for molding the cap.

Description

Referring to FIGS. 1–3, the cap 10 is adapted to be applied to the upper end of a container (not shown).

The cap 10 includes a base 11 and a peripheral flange 12 extending axially of the axis of the cap. A plurality of radially inwardly extending lugs 13 are provided on the inner surface 14 of the flange 12 adjacent the lower end thereof. An integral flexible resilient annular web 15 extends generally axially and radially outwardly from the inner surface 16 of the base 11 and is formed with an enlarged rib 17 on the free end thereof that is adapted to engage the upper end of the container. An integral annular rib 18 extends axially from the inner surface 16 of the base 11 in generally overlying relation to the free end of the web 15.

The container which is to receive the cap is formed at its upper end with a plurality of radially outwardly extending projections each of which has notches for receiving the lugs 13 as more fully shown and described in the parent application Ser. No. 540,338, filed Apr. 5, 1966.

The cap 10 is formed with a plurality of axially extending openings 13a in the base 11 which overlie the lugs 13 and result from the apparatus for manufacture of the cap, as presently described.

The cap 10 is made of a suitable plastic material which provides the desired flexibility of the integral web 15. A preferred material comprises polypropylene although other materials such as polyethylene can be used.

In order to make the cap in a single piece, an apparatus such as shown in FIG. 4 is used. The apparatus comprises a cavity retainer plate 30 in which a cavity body 31 is fixed. The cavity body 31 includes a cavity insert 32 so that a cavity is defined having a surface 33 defining the outer surface of the flange of the cap and a surface 34 defining the outer surface of the base of the cap.

The apparatus further includes a core retainer plate 35 that is movable axially relative to the cavity retainer plate and supports a central core body 36 fixed to the plate 35 and a stripper and core ring 37 which is movable axially relative to the core retainer plate 35. Specifically, a plurality of circumferentially spaced pins 38 are yieldingly urged upwardly by spring means 39 to in turn tend to urge the stripper and core ring 37 upwardly. An enlarged head or shoulder 40 on the pins 38 limits the upward movement of the stripper and core ring 37.

The stripper and core ring 37 includes an annular upwardly extending portion 41 that defines the inner surfaces of the flange 12 of the cap and a portion of the inner surface 16 of the base 11 which includes the rib 18 and the outer surface of the web 15. The core body 36 includes a central upwardly extending portion 42 that defines the inner surface of the web 15 and a portion of the inner surface 16 of the base 11 of the cap. Finally, an ejector pin 43 defines the remaining portion of the inner surface of the base of the cap.

A plurality of circumferentially spaced pin members 44 have their lower ends extending downwardly into the space which defines the flange of the cap. The pin members 44 are adapted to engage the outer surface of the annular portion 41 of the stripper and core ring 37. The lower ends of the pin members 44 define the upper surfaces of the lugs 13 of the cap.

3

In operation, the cavity retainer plate 30 is moved downwardly relative to the core retainer plate 35 and causes the stripper and core ring 37 to move axially into the position shown in FIG. 4 relative to the core retainer plate 35. Plastic under pressure is introduced through a runner to mold the cap. The cavity retainer plate 30 is then moved axially away from the core retainer plate. During this movement, the stripper and core ring 37 also moves axially upwardly. Further movement of the cavity retainer plate 30 causes the cap to be stripped from the cavity of the cavity body 31 leaving the cap on the stripper and core ring 37. Since the stripper and core ring 37 has moved upwardly relative to the core retainer plate 35 and core 36, the ejector pin 43 can then be moved upwardly to strip the cap from the stripper and core ring 37. The space that has been thus formed between the upper end 42 of the core body 36 and the annular projection 41 of the ring 37 is sufficient to permit flexing of the web 15 so that the stripping can take place.

The embodiments of the invention in which an exclusive property or privilege is claimed are defined as follows:

1. Apparatus for molding a plastic cap having a base, a peripheral flange extending axially from said base, and a flexible annular web surrounded by said flange and extending axially and radially outwardly from the inner surface of said base, said apparatus comprising: a first mold portion having a cavity for defining the outer surface of said base and the outer surface of said flange; a second mold portion having an upper surface for defining that portion of the inner surface of the base located between said web and said flange, an outer surface for defining the inner surface of said flange, and an inner surface for defining the upper, outer surface of said web; and a third mold portion having an upper surface for defining that portion of the inner surface of said base surrounded by said web, and an outer surface for defining the lower, inner surface of said web; said mold portions being movable relative to each other to permit said first and third mold portions to be separated from said second mold portion for stripping a cap therefrom.

2. Apparatus as claimed in claim 1 wherein said third mold portion includes a central core body having an axial opening, and an ejector pin slidably received in said axial opening with an upper end surface for defining a portion of the inner surface of the base, said ejector pin being operable to strip a cap from said second mold portion subsequent to separation of said first and third mold portions from said second mold portion.

3. Apparatus as claimed in claim 2 wherein said second mold portion comprises a core member concentrically slidably mounted on said core body.

4. Apparatus as claimed in claim 3 further including spring means urging said core member and core body to separate from each other.

5. Apparatus as claimed in claim 1 further including means for molding a plurality of radially inwardly projecting lugs integral with the inner surface of the peripheral flange of the cap, said means including a pin member for each lug extending from said first mold portion into cooperative relationship with the outer surface of said second mold portion to define the upper surface of the lug.

6. Molding apparatus for molding a one-piece plastic cap having a base, a peripheral flange extending axially therefrom, and a flexible annular web surrounded by said flange and having an inner annular end integral with the inner surface of said base and an outer annular free end spaced axially from said base and of a different diameter than the inner end such that one portion of the inner surface of the base defines an acute angle with one surface of the web, said molding apparatus comprising: a first mold portion having a cavity for defining the outer surface of said base and the outer surface of said flange; a second mold portion having an upper surface for defining said one portion of the inner surface of the base and an inclined surface for defining said one surface of the web; a third mold portion having an upper surface for defining the remaining portion of the inner surface of the base and an inclined surface for defining the other surface of the web; and an outer surface on one of said second and third mold portions for defining the inner surface of the flange; said first and third mold portions being separable from said second mold portion to permit a cap to be stripped from said second mold portion by distorting the web to remove it from the inclined surface of said second mold portion.

7. Molding apparatus as claimed in claim 6 wherein said outer surface for defining the inner surface of said flange is located on sai dsecond mold portion.

8. Molding apparatus as claimed in claim 7 wherein: the upper surface of said second mold portion has inner and outer edges, the inclined surface of said second mold portion extends downwardly and outwardly from said inner edge, and the outer surface on said second mold portion extends downwardly from said outer edge.

9. An apparatus for making a cap having a base, a peripheral flange, a plurality of radially inwardly extending lugs on the inner surface of the peripheral flange, and a flexible annular web on the inner surface of the base extending generally axially and radially of the base, said apparatus comprising: a cavity body having a cavity therein for defining the outer surface of the base and the outer surface of the peripheral flange; a core body; a core member mounted on said core body for axial movement; spring means yieldingly urging said core member toward said cavity body; said core member having an outer surface defining the inner surface of the flange of the cap, an upper surface defining that portion of the inner surface of the base of the cap located between the flexible annular web and the flange, and an inner surface defining the outer surface of the flexible annular web; means on said core body defining the inner surface of said flexible annular web and that portion of the inner surface of said base enclosed by said flexible annular web; and a plurality of pin members on said cavity body respectively having ends cooperating with the outer surface of said core member to define portions of said radially inwardly extending lugs.

10. Apparatus as claimed in claim 9 including an ejector pin positioned centrally of said core body and movable axially for ejecting said cap from the core member after the cavity body has been moved axially away from said core body.

11. Apparatus as claimed in claim 9 including means for limiting the axial movement of said core member away from said core body under the action of said spring means.

12. An apparatus for making a closure gap comprising a base, a peripheral flange, a plurality of radially inwardly extending lugs on the inner surface of the peripheral flange and an annular member on the inner surface of the base extending generally axially of the base, which apparatus comprises: a cavity body having a cavity therein for defining the outer surface of the base and the outer surface of the peripheral flange; a core body separable from said cavity body; a core member mounted relative to said core body for axial movement; said core member having an outer surface defining the inner surface of the flange of the cap, an upper surface defining that portion of the inner surface of the base of the cap located between the annular member and the flange, and an inner surface defining the outer surface of the annular member; means on said core body defining the inner surface of the annular member and that portion of the inner surface of said base enclosed by said annular member; and a plurality of pin members on said cavity body respectively having ends cooperating with the outer surface of said core member to define portions of said radially inwardly extending lugs.

13. Apparatus as claimed in claim 12 in which spring means yieldingly urge said core member toward said cavity body.

14. Apparatus as claimed in claim 13 including means for limiting the axial movement of said core member away from said core body under the action of said spring means.

15. Apparatus for making a cap having a base, a peripheral flange, a plurality of radially inwardly extending lugs on the inner surface of the peripheral flange, and a flexible annular web on the inner surface of the base extending generally axially and radially of the base, said apparatus comprising: a cavity body having a cavity therein for defining the outer surface of said base and the outer surface of said peripheral flange; a core body; means on said core body defining the inner surface of said flexible annular web and that portion of the inner surface of said base enclosed by said flexible annular web; a core member mounted on said core body for axial movement relative to said core body;

said core member having an outer surface defining the inner surface of said peripheral flange, an upper surface defining that portion of the inner surface of said base located between said flexible annular web and said peripheral flange, and an inner surface defining the outer surface of said flexible annular web, whereby axial separation of said core body from said core member releases said flexible annular web from confinement between said core member and core body to permit the cap to be axially stripped from said core member.

16. Molding apparatus for molding a one-piece cap having a base, a peripheral flange extending axially therefrom, a plurality of radially inwardly extending lugs on the inner surface of the peripheral flange, and an intergral annular web on the inner surface of the base of the cap extending axially therefrom and surrounded by said flange, said molding apparatus comprising: cavity means having a cavity with an outer surface for defining the outer surface of said flange and an upper surface for defining the upper surface of said base; core means having an outer surface for defining the inner surface of said flange as well as the inner surface and radially extending side surfaces of said lugs, upper surfaces for defining that portion of the inner surface of the base located between said web and said flange, the outer surface of the web, the inner surface of the web, and that portion of the inner surface of the base surrounded by said web; and pins projecting from said cavity means having lower ends for defining the upper surfaces of said lugs and forming openings in the base of the cap overlying the lugs.

17. Molding apparatus as claimed in claim 16 including an axially movable ejector pin positioned centrally of said core means for ejecting said cap from the core means subsequent to axial displacement of the cavity means with respect to the core means.

References Cited

UNITED STATES PATENTS

| | | | |
|---|---|---|---|
| 2,330,369 | 9/1943 | Marsh. | |
| 2,339,443 | 1/1944 | Wilson | 18—420 |
| 2,558,027 | 6/1951 | Wilson | 18—420 |
| 2,744,288 | 5/1956 | Fienberg et al. | 18—420 X |
| 3,013,308 | 12/1961 | Armour. | |
| 3,341,897 | 9/1967 | Susuki et al. | 18—420 |
| 3,343,222 | 9/1967 | Kacalieff | 18—420 |

J. HOWARD FLINT, JR., Primary Examiner

U.S. Cl. X.R.

18—2, 42, 45